United States Patent Office 3,846,074
Patented Nov. 5, 1974

3,846,074
DETERMINATION OF P₂O₅
Angelo Tulumello, Lansing, and Sixt Frederick Kapff, Homewood, Ill., assignors to Standard Oil Company, Chicago, Ill.
Filed Mar. 22, 1972, Ser. No. 237,094
Int. Cl. G01n 21/46, 31/04
U.S. Cl. 23—230 R                         24 Claims

ABSTRACT OF THE DISCLOSURE

Method and apparatus for determining the total phosphate content or $P_2O_5$ equivalent of a sample. The method employs hydrolysis of the sample, ion exchange chromatography and differential refractometry to obtain accurate values.

BACKGROUND OF THE INVENTION

This invention relates to the field of elemental analysis. More particularly, it is concerned with the determination of the phosphate content of a sample and is especially advantageous for obtaining values of the total $P_2O_5$ equivalent of fertilizers.

A common method for determining phosphate content includes hydrolyzing the polymeric phosphates followed by the addition of ammonium molybdate to precipitate ammonium phosphomolybdate. The precipitate is filtered and washed, dissolved in standardized alkali, and back titrated with an acid to obtain a value for phosphate content. Washing the precipitate requires great care in this method because coprecipitated compounds must be removed without dissolving the phosphomolybdate precipitate which is appreciably soluble.

Another method employs an ion-exchange column to separate the various forms of phosphate ions. This is accomplished by first admitting the sample to the column and then sequentially passing elution streams of increasing concentrations through the column. Separate collections of the eluted streams are then hydrolyzed and treated with ammonium molybdate and a reducing agent to produce a blue colored phosphate complex. Each of the samples is then compared to standards of known phosphate content by colorimetric analysis to determine their phosphate content.

In the manufacture of liquid fertilizers, the nitrogen and $P_2O_5$ contents of mixtures typically obtained by mixing phosphoric acid and ammonia solutions have long been controlled by monitoring the specific gravity and pH of the mixture. While this procedure may be adequate where high-purity furnace grade superphosphoric acid is used, it is not satisfactory when wet process superphosphoric acid is employed. The wet process acid is more economical to use than the furnace grade but contains numerous impurities including sulfuric acid, magnesium, calcium, aluminum and iron in large enough quantities to give precipitates and complexes. Composition control based on specific gravity becomes difficult because the concentrations of these impurities vary considerably. What is therefore needed is a process and system which can separate the impurities from the phosphates and then quickly and accurately determine the phosphate content.

SUMMARY OF THE INVENTION

We have now discovered an accurate and quick method for determining the phosphate or $P_2O_5$ content of a sample which may be performed without the aid of a skilled technician and is particularly suited to automation. Our apparatus is particularly suited to our method and, if desired, may be incorporated as an element in a closed loop control system for blending a phosphate-containing product.

In our method, a quantity of the sample is mixed with an acid to hydrolyze the polymeric phosphates present. The resulting mixture is then subjected to ion-exchange chromatography to obtain a continuous stream containing a chromatographic distribution of the different anions present in the sample. The location of the phosphates in the stream may be determined by prior experiments with samples of varying phosphate levels which will indicate the length of time for the phosphates to pass through the column. We then obtain an indication of the refractive index of the phosphate-containing portion of the stream and that value is proportional to the phosphate content. The refractive index indication may then be converted to the corresponding value for phosphate content or $P_2O_5$ equivalent. The refractive index indicator may be calibrated to read the phosphate content or $P_2O_5$ equivalent directly. Preferably, the process is automatically controlled so that the sample is admitted to the system and automatically processed to obtain the phosphate content. The result may be used for inspection purposes or may directly generate a signal which will control the rate of phosphate addition to the blended product.

DETAILED DESCRIPTION OF THE INVENTION

Figure 1:
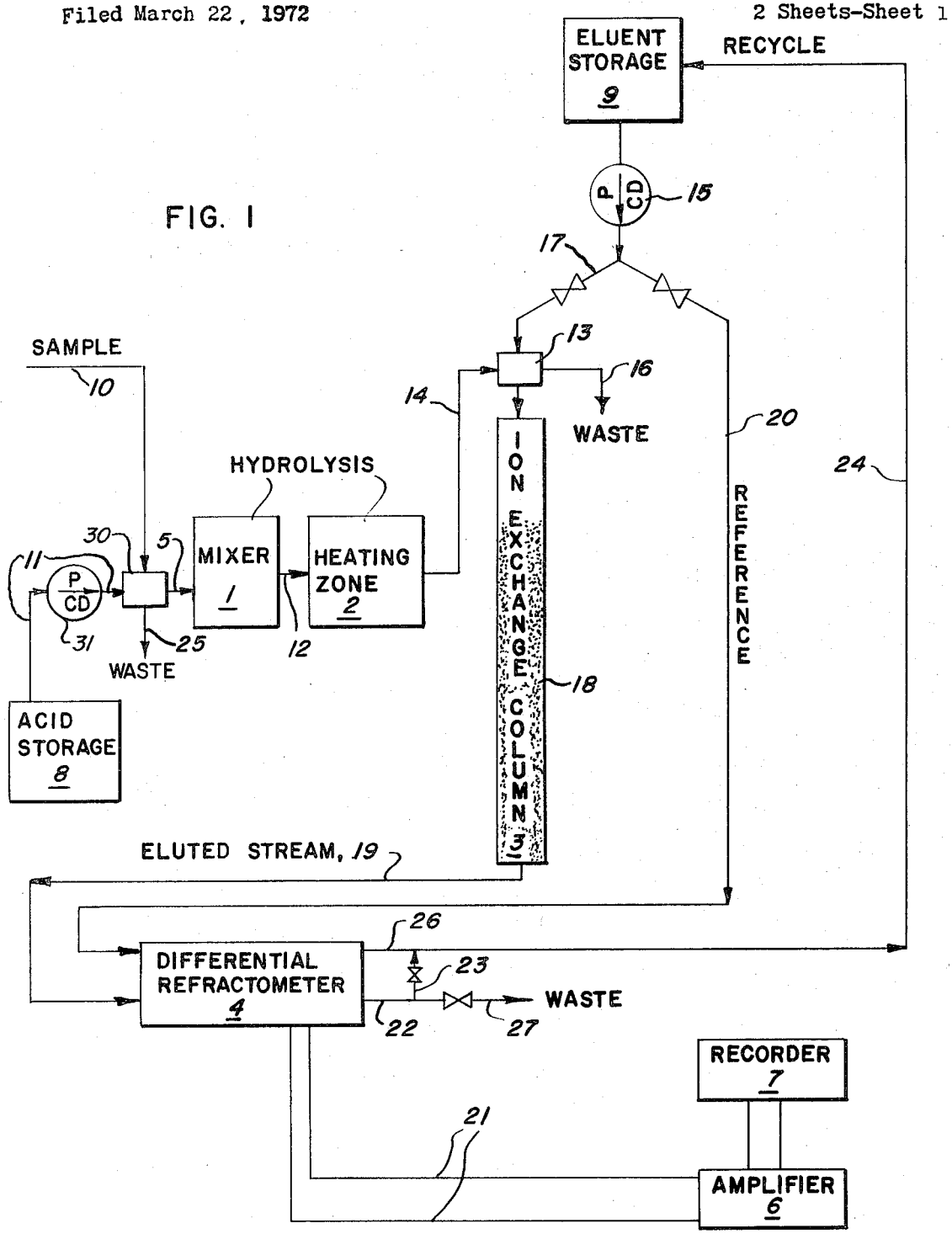
FIG. 1 is a diagrammatic view of the preferred system of our invention.

Both simple phosphates and polymeric phosphates may be present in normal fertilizer blends. In order to simplify our analytical procedure, the polymeric forms are first converted to the simple orthophosphate form. Accordingly the sample is first mixed with an acid solution which serves to convert the phosphates from their polymeric structures and maintain them as orthophosphates. It has been reported in the literature that the rate of this hydrolysis reaction is very sensitive to both temperature and pH. At room temperature and a pH of greater than 4, the half-life of the hydrolysis reaction may be as long as several months depending on the specific phosphate compounds present. At room temperature and a pH of 1, the half-life may be as long as four days. On the other hand, the half-life is lowered to about one-hour at 210° F. and a pH of 4 and about four minutes at 210° F. and a pH of 1. Consequently, it is preferred to effect the hydrolysis at an elevated temperature and low pH in order to reduce the hydrolysis time. Of course, the acid used for hydrolysis must not boil or become chemically unstable at the operating temperature. Preferably, the acid will be a mineral acid such as sulfuric acid; the hydrolysis temperature will be slightly less than the boiling point of the mixture, e.g. 210° F.; and acid concentration will give a pH of about 1. Neither the acid solution nor the eluent should contain phosphate ions or any other anion having a resin selectivity similar to that of the phosphate ions because this will interfere with the separation and measurement of the phosphates. If the sample contains appreciable quantities of phosphorus in reduced oxidation states, the sample may be oxidized, for example with nitric acid, prior to hydrolysis. In our preferred embodiment, 5 volumes of 15% sulfuric acid are used to hydrolyze one volume of the sample. The components are mixed and heated to 210° F. for about 10 minutes. At this time a precise predetermined quantity of the hydrolyzed mixture is withdrawn and added to the acidic eluent stream entering the top of an ion exchange column for the purpose of separating the phosphate anions from other interfering anions.

The column contains an anion exchange (basic) resin which is chemically stable at low pH, is not appreciably soluble in the eluent, contains no available phosphate ions, and which exhibits good kinetic and equilibrium characteristics. Numerous examples of anion exchange resins are detailed in *Encyclopedia of Chemical Technology*, 2ed., Kirk-Othmer, ed., (1966), XI, 875–877. We have found the strongly basic resins to be most effective in performing the phosphate separation. Specifically, Dowex 1–X8 (200–400 mesh), a polymeric quaternary ammonium compound selective to the chloride ion and manufactured by Dow Chemical Company, Midland, Mich., possesses the desired physical and chemical properties.

During operation, an acidic eluent stream enters the column at a predetermined flow rate. The stream must be maintained at low pH to enhance the resin stability. It must also contain anions which are selective to the resin which will therefore compete with the anions of the sample for positions within the resin matrix. The relative selectivity of the resin to the various anions in the sample will determine the net velocity at which each of the anion species travels through the column. While the acidity and anion of the eluent may be supplied by a single acid, we have found it convenient to employ a salt as the source of the anion. In particular, the combination of a chloride salt and dilute sulfuric acid is suitable. The anion of the solvent may be any anion which has a preferred selectivity toward the resin so long as the anion will not interfere with the phosphate separation and measurement. If supplied as a salt, it may be the salt of ammonium or a metal of group I, II, or III of the periodic table. We have found a 0.5% $H_2SO_4$ solution containing 40 g./l. of potassium or ammonium chloride to be quite effective with the Dowex resin. The use of ion exchange chromatography is discused in *Encyclopedia of Chemical Technology*, 2ed., Kirk-Othmer, ed., (1966), V, 421–422 et seq. In order to obtain a sharp separation of the phosphate ions and in order to predict the period of time it takes for the phosphate ions to travel the column length, it is desirable to establish a standard sample quantity and eluent flow rate to be used in all runs. Preliminary experiments using samples which are identical except for modifications to the phosphate content will help pinpoint the location of the phosphates of all future tests of similar samples under the same conditions. In our preferred embodiment the eluent is controlled at a flow rate of 10 cc/minute for a 49 $\mu$l. sample.

The next step in our process is obtaining an indication of the refractive index of the phosphate portion of the column effluent or eluted stream which has been found to be proportional to the phosphate content. If all reagents and conditions are maintained constant, this may be accomplished by a direct measurement of the refractive index and comparison to a predetermined correlation between the refractive index and phosphate content. We prefer to employ the principle of differential refraction. A reference stream of the solvent bypasses the column and feeds directly to the differential refractometer. The eluted phosphate-containing stream also passes through the instrument and a signal is generated which is proportional to the relative refractive index of the phosphate stream to that of the solvent. This signal is amplified, measured and can be converted to the corresponding phosphate content or $P_2O_5$ equivalent by plotting data from known samples. The signal output indicator may be calibrated to read phosphate directly, either on a meter or recorder, or it may be employed in a closed loop control system to control the addition of phosphate to the blended phosphate product. Once the location of the phosphate portion of the eluted stream has been established, results may be obtained either by diverting only that portion through the refractometer or by diverting the entire stream and taking a reading only on the phosphate portion.

In order to minimize errors in reproducibility, it is desirable to maintain the column, reference stream, and refractometer at a constant temperature. The specific temperature is not critical and temperatures slightly above maximum ambient temperatures are most convenient.

In the preferred embodiment of our invention, the entire process is automatic. Precision pumps, flow and sample valves, and a timing relay circuit system are used to control process operations. When the system is not processing a sample but is in the "ready" position, eluent is continuously recycled through the column and back to the eluent storage tank to maintain column stability and temperature. When a sample has passed through the column, the column effluent is discarded to avoid contamination of the eluent. In the automated process, special steps must be taken if solids will be present following hydrolysis. As shown in the drawing, the sample may be hydrolyzed by manual procedures and placed in a special sample receiver provided with a filter. A metered sample may then be admitted directly to the column, by-passing the automatic hydrolysis. As an alternative, a filtering step may be provided between the automatic hydrolysis step and the column to remove solids. Either of these procedures may be employed to obtain phosphate values for liquid as well as suspension or solid samples.

The preferred embodiment of our system is shown in FIG. 1. It includes a mixer 1, a heating zone 2, an ion exchange column 3, a differential refractometer 4, an amplifier 6, a recorder 7, an acid storage tank 8 and an eluent storage tank 9. The sample is admitted to the system in a predetermined quantity via line 10, timing cycle operated valve 30, and line 5. Acid is admitted from tank 8 via line 11 at a predetermined flow rate as controlled by precision pump 31. The two components are mixed and flow via line 12 to the heating zone 2 where hydrolysis is completed. The hydrolyzed mixture then passes via line 14 to hydrolyzed sample valve 13 which admits an exact predetermined quantity of the mixture to the column, the remainder of the mixture being discarded via line 16. Eluent is supplied to valve 13 from eluent storage 9 via precision pump 15 and valved line 17 to flush the mixture into the column. The hydrolyzed sample and eluent pass through the column containing an anion exchange resin 18 and the eluted stream exits from the column via line 19. The eluted stream in line 19 contains a chromatographic distribution of the anions and passes to differential refractometer 4. A second eluent stream is withdrawn from eluent storage for use as a reference stream and fed to the refractometer via valved line 20. The refractometer measures the difference in the refractive index between the eluted stream and the reference stream and emits a signal via electrical connections 21 which is amplified and recorded via amplifier 6 and recorder 7.

In order to maintain the column in the desired chemical state, eluent must be passed through the colume between sample runs. A valved recycle line 22, 23, 24 returns the uncontaminated eluent to the storage tank. During sample processing, the eluted stream is discarded via line 27 rather than recycling. The reference eluent is recycled via line 26 and 24 at all times since it never becomes contaminated.

For improved reproducibility of results, column 3, reference line 20, and refractometer 4 may be enclosed within a temperature control device not shown.

Figure 2:
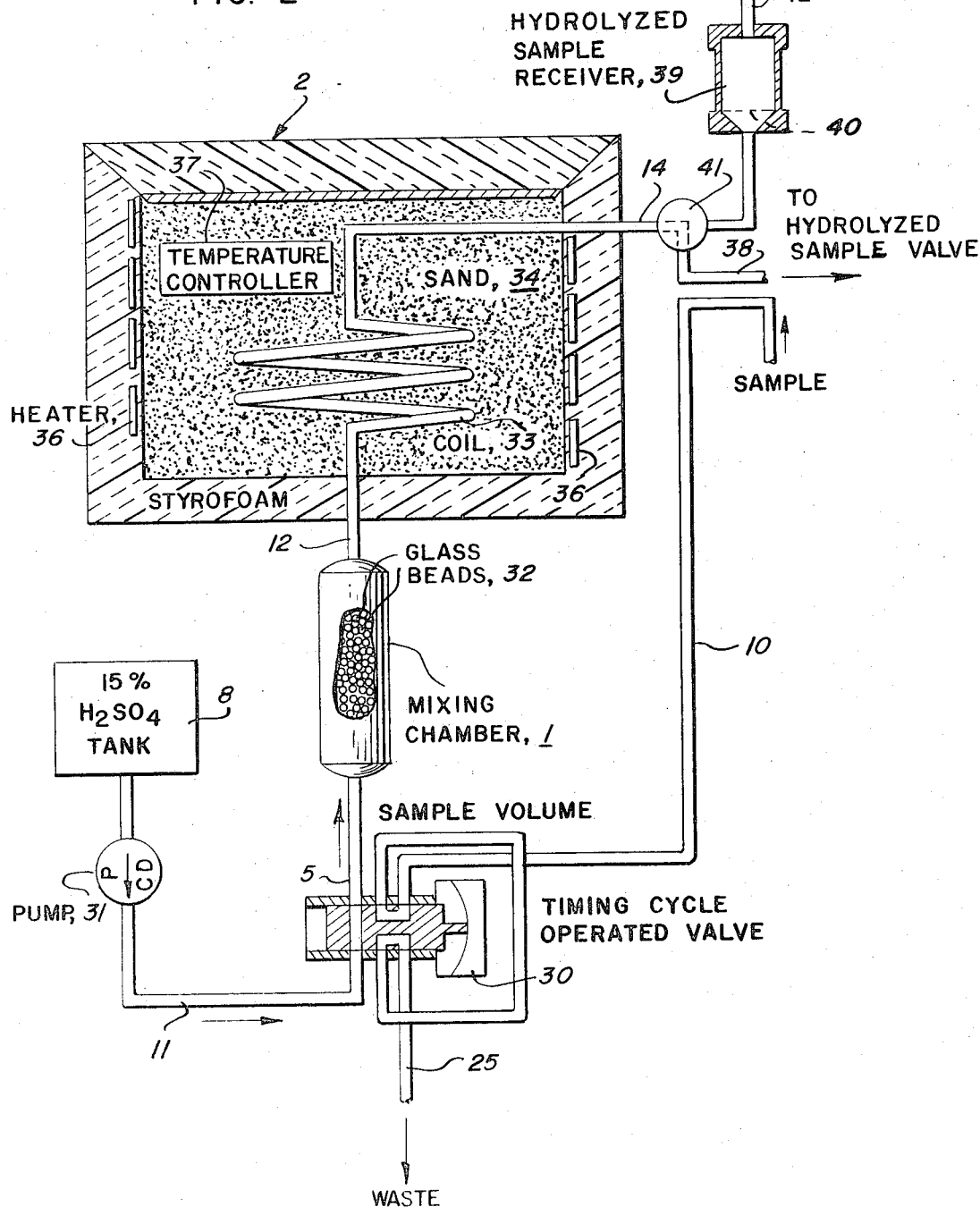
FIG. 2 is a detailed diagrammatic view of the preferred hydrolysis sub-system of our invention partly in section.

FIG. 2 depicts the preferred hydrolyzation system of our invention. The sample enters via line 10 and a predetermined quantity is admitted to mixing chamber 1 via timing cycle operated valve 30. Excess sample is discarded via line 25. At the same time, acid enters the chamber via line 11 from tank 8 and flow is controlled by precision pump 31. The glass beads 32 force the two streams to mix in the chamber and the pump forces the mixture into a coil 33 surrounded by sand 34. The coil and sand are maintained at an elevated temperature by heater 36 and controller 37 having electrical leads not shown. The flow rate and coil dimensions are designed to permit sufficient hold-up time for the hydrolysis reaction to become substantially complete. The hydrolyzed sample then passes to the hydrolyzed sample metering valve via line 38. When a sample will contain solids following hydrolysis the reaction may be effected using manual techniques and the hydrolyzed sample placed in receiver 39 provided with filter 40. The mixture will then proceed to the hydrolyzed sample metering valve by suitable orientation of selector valve 41. The driving force for moving this mixture may be air pressure through line 42.

We claim:

1. A process for obtaining a representation of the total phosphate content of a sample containing phosphate and at least one other anion, comprising:
   (1) hydrolyzing the sample with a dilute acid of sufficient strength and in sufficient quantity to convert substantially all of the phosphates to the orthophosphate form;
   (2) separating the phosphate ions from other anions by ion-exchange chromatography, whereby an eluted stream containing a chromatographic distribution of the different anions is obtained;
   (3) obtaining an indication of the refractive index of the phosphate-containing portion of said eluted stream; and
   (4) converting said indication to a representation of the phosphate content.

2. The process of Claim 1 wherein the separation by ion-exchange chromatography is accomplished by simultaneously contacting a known quantity of the hydrolyzed mixture with an anion exchange resin and an acidic eluent stream of predetermined flow rate, said stream containing anions capable of successfully displacing other anions from the resin.

3. The process of Claim 2 wherein the acidic eluent stream contains sulfuric acid.

4. The process of Claim 3 wherein the acidic eluent stream also contains a dissolved salt containing a cation selected from the group consisting of ammonium or a metal from groups I, II and III of the periodic table of the elements, and an anion capable of displacing other anions from the resin.

5. The process of Claim 4 wherein the salt is potassium chloride.

6. The process of Claim 1 wherein the sample comprises a solid which remains at least partially insoluble after the hydrolysis step and wherein the insoluble solids are removed after the hydrolysis step but prior to the separation step.

7. The process of Claim 1 wherein said hydrolysis is conducted at elevated temperatures.

8. The process of Claim 7 wherein the temperature is slightly less than the boiling point of the hydrolyzed mixture.

9. The process of Claim 8 wherein the temperature is 210° F.

10. The process of Claim 2 wherein the dilute acid and acidic eluent have a pH of less than about 4.

11. The process of Claim 10 wherein the dilute acid has a pH of about 1.

12. The process of Claim 1 wherein the sample is subjected to oxidation prior to the hydrolysis step.

13. The process of Claim 12 wherein the oxidation is accomplished by contacting the sample with nitric acid.

14. The process of Claim 1 wherein the final three steps are performed automatically.

15. The process of Claim 14 wherein all four steps are performed automatically.

16. The process of Claim 1 wherein the second and third steps are performed at a predetermined constant temperature.

17. A system for obtaining a representation of the total phosphate content of a sample containing phosphate and at least one other anion, comprising:
   (1) means for hydrolyzing the sample adapted to receive said sample and a hydrolyzing acid;
   (2) ion exchange separating means adapted to receive said hydrolyzed sample and an eluent stream for effecting a chromatographic separation of the anions in an eluted stream;
   (3) means for receiving said eluted stream and obtaining an indication of the refractive index of the phosphate containing portion of said stream; and
   (4) means for converting said indications to a representation of the phosphate content.

18. The system of Claim 17 wherein said hydrolyzing means include:
   (1) an acid source;
   (2) means in communication with said acid source for supplying a predetermined flow of acid;
   (3) a sampling valve in communication with the sample for admitting a predetermined quantity of sample to the system;
   (4) a mixer in communication with said sampling valve and said acid supply means for receiving and mixing said sample and said acid stream;
   (5) a temperature controlled zone in communication with said mixer for receiving said mixed sample and acid, whereby said hydrolysis is effected; and
   (6) means for withdrawing said hydrolyzed mixture from said zone.

19. The system of Claim 18 wherein said temperature controlled zone includes a continuous coil surrounded by a sand bath maintained at the desired temperature.

20. The system of Claim 17 wherein the ion-exchange separating means include a packed-column containing a basic anion exchange resin.

21. The system of Claim 17 wherein said refractive index means include:
   (1) means for receiving a second stream of said eluent as a reference stream; and
   (2) optic means for determining the refraction differential between the eluted stream and said second stream.

22. The system of Claim 17 additionally including means for automatically performing the separation, refractive index and representation means.

23. The system of Claim 22 which additionally includes means for recycling eluent to the separating means from the refractive index means.

24. The system of Claim 17 additionally including means for maintaining said separation and said refractive index means at a constant temperature.

References Cited

UNITED STATES PATENTS

| | | | |
|---|---|---|---|
| 3,075,426 | 1/1963 | Robinson | 356—130 |
| 3,468,607 | 9/1969 | Sloane et al. | 356—73 |

OTHER REFERENCES

Czech et al.: *Automation in Anal. Chem.*, "Some Aspects of Ion Exchange Chromatographic Analysis of Condensed Phosphates," Mediad Press, N.Y. (1966), vol. 1, pp. 163–166.

Fribance: *Industrial Instrumentation Fundamentals*, McGraw-Hill, N.Y. (1962), pp. 645–648; POSL TA–165–F8–C.3.

Carroll: *Industrial Process Measuring Instruments*, McGraw-Hill, N.Y. (1962), pp. 373–377; POSL TA–165–C3i–C.2.

Lundgren: *Analytical Chemistry*, v. 32, #7 (1960), pp. 824–828.

Furman, ed.: *Standard Methods of Chemical Analysis*, 6th ed., Van Nostrand Co., Princeton, N.J. (1962), p. 812.

MORRIS O. WOLK, Primary Examiner

T. W. HAGAN, Assistant Examiner

U.S. Cl. X.R.

23—253 R; 356—130